UNITED STATES PATENT OFFICE.

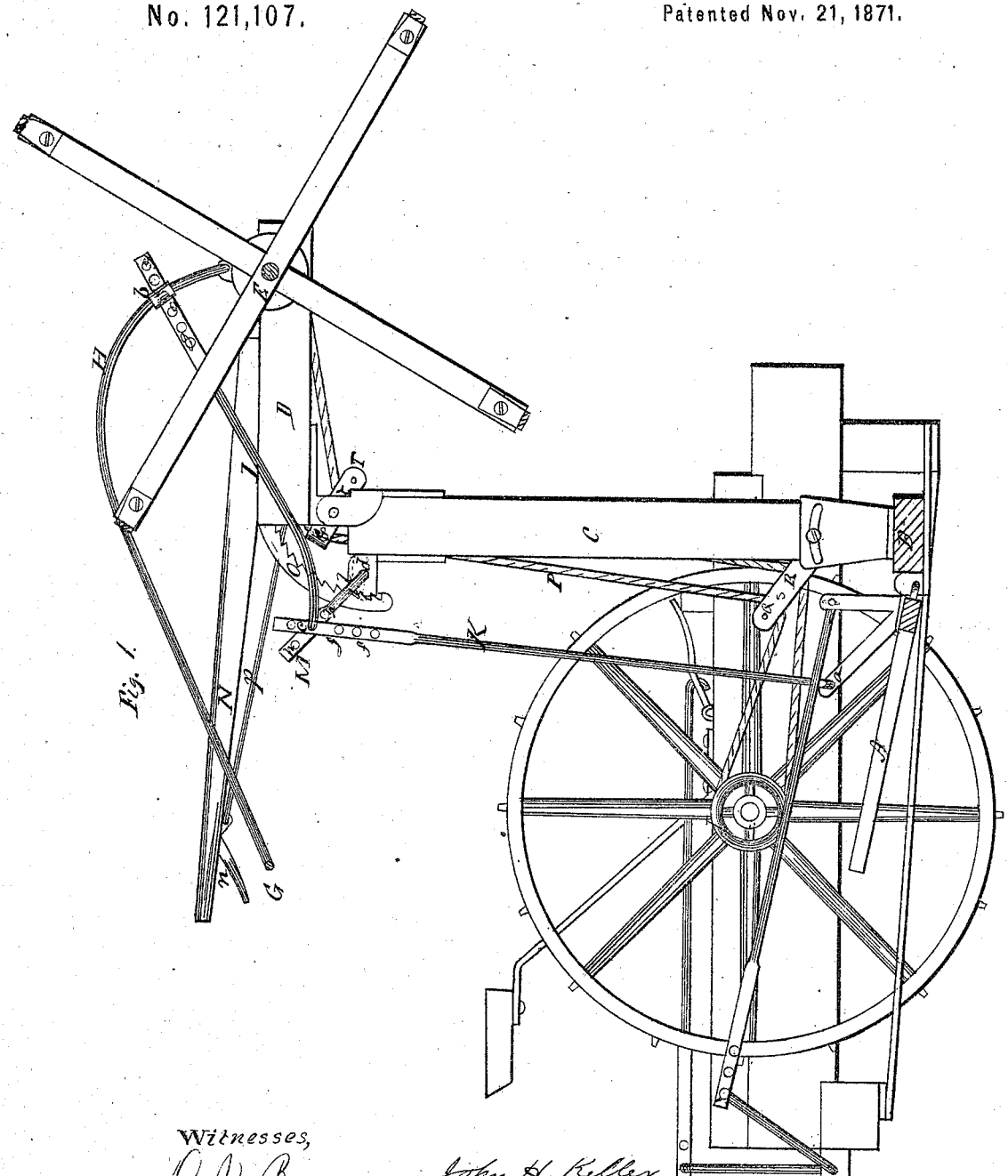

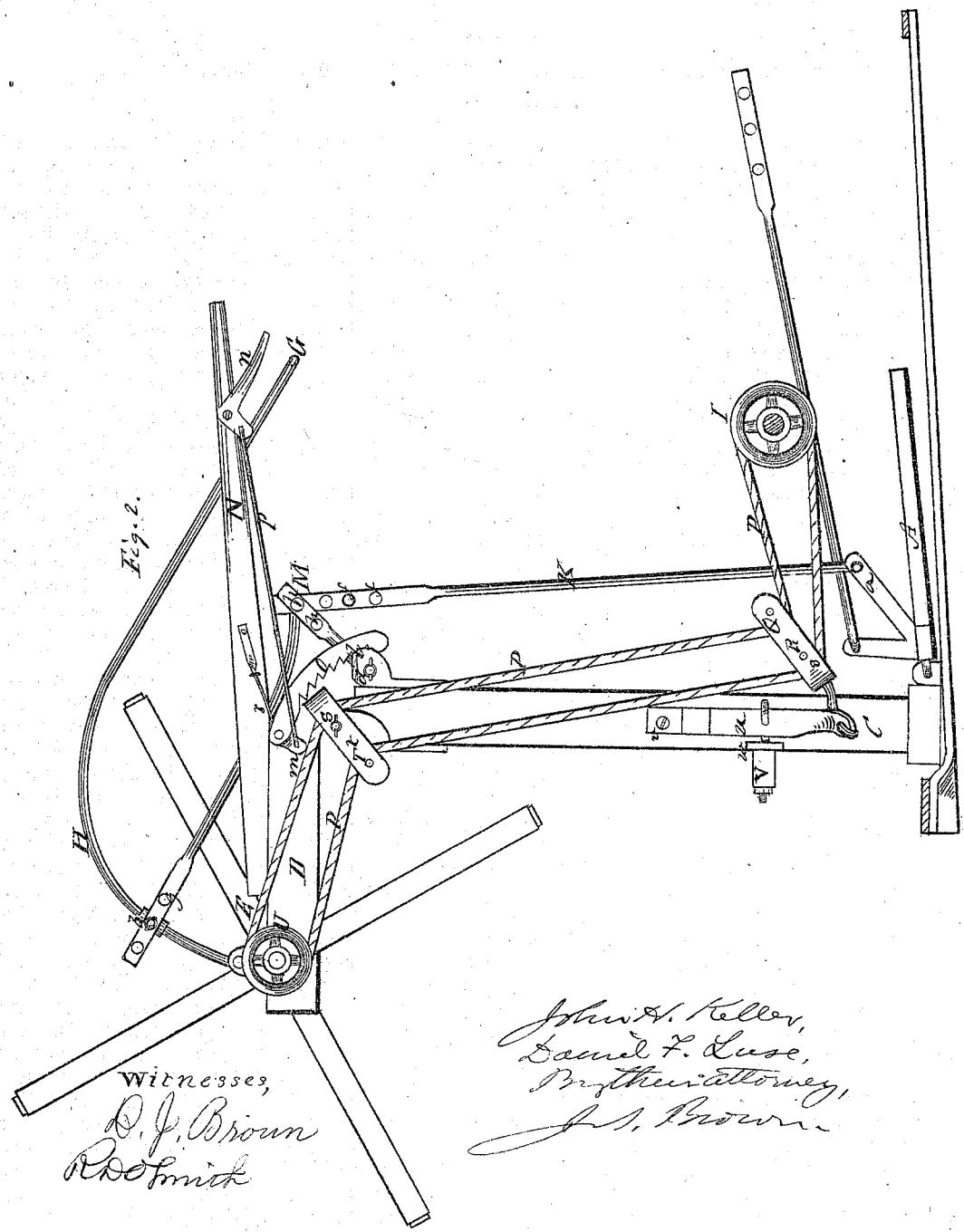

JOHN H. KELLER, OF BOALSBURG, AND DANIEL F. LUSE, OF CENTRE HALL, PENNSYLVANIA.

IMPROVEMENT IN ADJUSTABLE REELS AND CUT-OFFS FOR HARVESTERS.

Specification forming part of Letters Patent No. 121,107, dated November 21, 1871.

*To all whom it may concern:*

Be it known that we, JOHN H. KELLER, of Boalsburg, and DANIEL F. LUSE, of Centre Hall, in the county of Centre and State of Pennsylvania, have invented certain Improvements in Harvesters; and we do hereby declare that the following is a full and exact description thereof, reference being had to the accompanying drawing making part of this specification—

Figure 1 being a side elevation of the improved harvester, from a vertical section cutting from front to rear through the platform and reel; Fig. 2, a side elevation of the reel and platform and their adjuncts, looking in a direction opposite to the view in Fig. 1, from a section cutting from front to rear between the body of the harvester and the platform.

Like letters designate corresponding parts in both figures.

The nature of our invention consists in certain special improvements for adjusting the cut-off and reel together on the cutter-bar, in connection with the movements of the platform or dropper, as hereinafter specified.

Let A represent the harvester, platform, or dropper; B, the finger-bar; C, the fixed standard of the reel-support; D, the adjustable hinged arm of the reel-support; E, the reel; and G, the cut-off of the harvester. The platform A is of the dropper kind; and the cut-off G, by a suitable connecting-rod or rods, is caused to vibrate up and down simultaneously with the corresponding movements of the dropper, so as to hold the last cut grain from falling and tangling while the dropper is discharging a gavel of grain, but to rise out of the way of the falling grain when the dropper is raised for the reception thereof. Ordinarily the movement of this cut-off continues uniform, however much the reel E may be adjusted in height to suit different heights of standing grain.

One of the main objects of our invention is to render the cut-off self-varying and self-adjusting in height, to correspond with the adjustments of the reel in height. This is effected by the following device: Instead of making the connection between the platform or dropper and the arm H, which bears the cut-off G, direct and immediate, we employ two connecting-rods, K L, one, connected with the dropper, being pivoted to an arm or projection, *a*, thereof, and the other, connected with the cut-off arm H, being pivoted to a sleeve or projection, *b*, thereof, and the two being pivoted or equivalently connected together as at *c*; so that the direction of the movement of the secondary connecting-rod L may vary from that of the prime moving rod K, and thus a variable movement by said secondary rod may be produced by a constant movement of the said prime moving rod. And the pivot connection *c* between the two rods also is controlled by means of a vibratory directing arm, crank, or elbow, M, which turns or vibrates in a bearing, *d*, at or near the upper end of the standard C of the reel-support. The circular vibrations of this directing arm cause the motions given by the primary rod K to communicate motions to the secondary rod L, without loss or uncertainty, though the direction of the latter may be varied at will. The length of both rods, K L, may be varied by means of a set of pivot-holes, *f f*, in the upper part of the rod K, to receive the pivot-end of the rod L; and of another set, *g g*, of holes in the upper part of the rod L, to receive the pivot of the arm H. These adjustments vary the absolute height and position of the cut-off. Also the pivoted connection of the two rods is varied upon the directing arm M by means of similar adjusting holes *h h*, or their equivalent, in said arm, whereby the movement of the primary rod K in its vibrations may be more or less rapidly changed in direction, or communicated to the secondary rod L. The cut-off arm H is pivoted to the arm D of the reel-support at *i*, near the axis of the reel, and it preferably has a curved form, as represented. The action of this device is such that, as the reel E is raised by swinging its hinged arm D upward and backward, the secondary rod L is brought more nearly in line with the primary rod K, and hence a given movement of the latter raises the cut-off rod G higher than before; and as the reel is lowered by swinging downward and forward the arm D, the rod L is moved further from line with the rod K, and the same movement of the latter raises the cut-off less than before. The downward movement of the cut-off rod in both cases is correspondingly high or low. The several parts are arranged and adjusted so that this variation of the rise and fall of the cut-off corresponds in extent with the adjustment of the reel, as desired; and it is self-adapting. The device is especially applicable to the jointed reel-support as described, and hence there is a useful combination of the two devices. But this self-adapting cut-off is also applicable to all reels, which, as they are adjusted in height, also are moved more or less laterally in position, so that the directions of the two rods K L approach more nearly to the same line when the reel is raised; as, for instance, if the reel were adjustable in a curved slot.

The self-adjusting cut-off device, in connection with the reel, is brought completely under the control of the driver in his seat, and while the harvester and its reel continue in motion, by means of an adjusting lever, N, attached to the arm D of the reel-support, and extended backward within reach of the driver, and of a curved hook ratchet-bar, O, pivoted to the lever and catching by its notches upon a fixed detent or catch, $l$, on the reel-standard C, in lowering the rear end of the lever N the reel-arm D is raised, and the ratchet-bar catches and holds automatically. But to raise the lever and lower the reel-arm the ratchet-bar must first be released from its catch $l$. This is conveniently effected by means of a short arm, $m$, projecting downward from the ratchet-bar near its pivot, and of a short bell-crank lever, $n$, pivoted to the lever N near its rear end, and connected with the arm $m$ by a connecting-rod, $p$, all substantially as shown in Fig. 2. By raising the handle of the bell-crank lever, and thereby drawing through the connecting-rod $p$ on the arm $m$, the ratchet-bar O is lifted from its catch. A spring, $r$, attached to the lever N and bearing on (or otherwise acting to depress) the ratchet-bar, as shown, returns the latter to its catch at any time, and keeps the reel-arm supported. The driving-chain, belt, or cord P passes from its driving-pulley I, on the main shaft of the harvester, forward, around two loose pulleys, Q R, in a stirrup, $s$, at or near the lower end of the reel-standard C; thence upward, around two pulleys, S T, one concentric with the pivot-joint of the adjusting arm D of the reel-support, and the other mounted in a stirrup, $t$, swinging freely on the axis of the power pulley as a center; thence the cord or chain passes forward to a pulley, U, on the reel-shaft. The pulley T and the swinging stirrup $t$ keep the cord or chain at nearly equal tension whatever position the arm D is adjusted to. And in order to keep the tension sufficient and nearly uniform with adjustments of the standard C, or vibrations of the finger-bar, the stirrup $s$ is linked or hooked to a vibratory arm or lever, $u$, pivoted at $v$ to the standard; and this arm is kept drawn forward by an India-rubber or other spring, V, bearing against a projection, $w$, of the standard, so that an elastic tension is kept drawing upon the stirrup.

What we claim as our invention, and desire to secure by Letters Patent, is—

1. The connecting-rods K L, moving in different and variable directions, and the pivoted directing arm M, when arranged on a harvester, in combination with the cut-off arm and reel, which have a simultaneous height and lateral adjustment, so as to make the cut-off rod self-adapting in its movements to the adjustments of the reel, substantially as herein specified.

2. The combination of the connecting-rods K L, directing arm M, cut-off rod G, movable arm D of the reel-support, adjusting lever N, and ratchet-bar O, arranged and operating together substantially as herein set forth.

3. The combination of the connecting-rods K L, directing arm M, cut-off rod G, movable arm D, standard C, pulleys Q R and S T, spring V, and endless driving-chain, belt, or cord P, as and for the purpose herein set forth.

Specification signed by us this 29th day of June, 1871.

JOHN H. KELLER.
D. F. LUSE.

Witnesses:
GEORGE DURST,
HENRY BOLLINGER. (74)